United States Patent
Cheng et al.

(10) Patent No.: US 11,050,084 B2
(45) Date of Patent: *Jun. 29, 2021

(54) ELECTROLYTE SOLUTIONS FOR HIGH ENERGY CATHODE MATERIALS AND METHODS FOR USE

(71) Applicant: Wildcat Discovery Technologies, Inc., San Diego, CA (US)

(72) Inventors: Gang Cheng, San Diego, CA (US); Bin Li, San Diego, CA (US); Steven Kaye, San Diego, CA (US)

(73) Assignee: WILDCAT DISCOVERY TECHNOLOGIES, INC, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/955,583

(22) Filed: Dec. 1, 2015

(65) Prior Publication Data

US 2016/0093918 A1    Mar. 31, 2016

Related U.S. Application Data

(63) Continuation of application No. 14/220,062, filed on Mar. 19, 2014, now Pat. No. 9,236,634, which is a
(Continued)

(51) Int. Cl.
*H01M 10/0567* (2010.01)
*H01M 10/0525* (2010.01)
(Continued)

(52) U.S. Cl.
CPC ......... *H01M 10/0567* (2013.01); *H01M 4/38* (2013.01); *H01M 4/583* (2013.01);
(Continued)

(58) Field of Classification Search
None
See application file for complete search history.

(56) References Cited

U.S. PATENT DOCUMENTS

| | | | |
|---|---|---|---|
| 6,284,412 B1 * | 9/2001 | Minakata | H01B 1/122 |
| | | | 429/300 |
| 8,308,971 B1 | 11/2012 | Bhat et al. | |

(Continued)

FOREIGN PATENT DOCUMENTS

| | | |
|---|---|---|
| CN | 1385918 A | 12/2002 |
| JP | 2013157088 A | 8/2013 |

(Continued)

OTHER PUBLICATIONS

International Search Report and Written Opinion dated Aug. 12, 2014 in connection with PCT/US2014/028304.
(Continued)

*Primary Examiner* — Haixia Zhang
(74) *Attorney, Agent, or Firm* — Philip S. Hof; The Small Patent Law Group, LLC

(57) ABSTRACT

Described herein are materials for use in electrolytes that provide a number of desirable characteristics when implemented within batteries, such as high stability during battery cycling up to high temperatures, high voltages, high discharge capacity, high coulombic efficiency, and excellent retention of discharge capacity and coulombic efficiency over several cycles of charging and discharging. In some embodiments, a high voltage electrolyte includes a base electrolyte and a set of additive compounds, which impart these desirable performance characteristics.

20 Claims, 11 Drawing Sheets

Related U.S. Application Data continuation of application No. PCT/US2014/028304, filed on Mar. 14, 2014.

(60) Provisional application No. 61/786,633, filed on Mar. 15, 2013.

(51) Int. Cl.
  *H01M 10/0568* (2010.01)
  *H01M 10/0569* (2010.01)
  *H01M 4/38* (2006.01)
  *H01M 4/583* (2010.01)

(52) U.S. Cl.
  CPC ... *H01M 10/0525* (2013.01); *H01M 10/0568* (2013.01); *H01M 10/0569* (2013.01); *Y02E 60/10* (2013.01)

(56) References Cited

U.S. PATENT DOCUMENTS

| | | | |
|---|---|---|---|
| 9,236,634 B2 * | 1/2016 | Cheng et al. | 429/188 |
| 2002/0051910 A1 | 5/2002 | Yoshimura et al. | |
| 2002/0192557 A1 | 12/2002 | Choi et al. | |
| 2003/0073000 A1 | 4/2003 | Lee et al. | |
| 2003/0124433 A1 | 7/2003 | Kim et al. | |
| 2004/0029014 A1 | 2/2004 | Hwang et al. | |
| 2004/0081895 A1 * | 4/2004 | Adachi | H01M 4/13 429/344 |
| 2006/0063073 A1 | 3/2006 | Kawashima et al. | |
| 2006/0078801 A1 | 4/2006 | Yamaguchi et al. | |
| 2006/0199080 A1 | 9/2006 | Amine et al. | |
| 2007/0160906 A1 | 7/2007 | Tooyama et al. | |
| 2007/0196740 A1 * | 8/2007 | Haruna | H01M 10/0567 429/326 |
| 2008/0248396 A1 | 10/2008 | Jung et al. | |
| 2009/0035646 A1 | 2/2009 | Mikhaylik et al. | |
| 2009/0142663 A1 | 6/2009 | Takeuchi et al. | |
| 2010/0040954 A1 | 2/2010 | Amine et al. | |
| 2010/0047694 A1 | 2/2010 | Chu et al. | |
| 2010/0209780 A1 * | 8/2010 | Muldoon | C07C 259/06 429/326 |
| 2011/0151337 A1 | 6/2011 | Kim et al. | |
| 2012/0009485 A1 | 1/2012 | Xu et al. | |
| 2012/0070750 A1 | 3/2012 | Blanc et al. | |
| 2012/0082872 A1 | 4/2012 | Schmidt et al. | |
| 2012/0135298 A1 | 5/2012 | Yamada et al. | |
| 2012/0141878 A1 | 6/2012 | Ohashi et al. | |
| 2012/0141883 A1 | 6/2012 | Smart et al. | |
| 2012/0231327 A1 | 9/2012 | Hiratsuka | |
| 2013/0122379 A1 | 5/2013 | Hwang et al. | |
| 2013/0196190 A1 | 8/2013 | Yamada et al. | |

FOREIGN PATENT DOCUMENTS

| | | |
|---|---|---|
| KR | 1020040000129 B1 | 1/2004 |
| KR | 100463188 B1 | 12/2004 |

OTHER PUBLICATIONS

Lee et al., "Effect of an organic additive on the cycling performance and thermal stability of lithium-ion cells assembled with carbon anode and LiNi1/3Co1/3Mn1/3O2 cathode," Journal of Power Sources 196 (2011) 6997-7001.

Extended European Search Report dated Feb. 24, 2016 in EP application No. 16275007.9.

Michael, M.S. et al., "Rechargeable lithium battery employing a new ambient temperature hybrid polymer electrolyte based on PVK+PVdF-HFP(copolymer)" Journal of Power Source, vol. 136, No. 2 (Oct. 2004).

Notice of Preliminary Rejection dated Apr. 18, 2016 in KR patent application No. 10-2015-0189391.

Second Office Action for corresponding CN Application No. 201710548597.7 dated Aug. 13, 2019.

Decision rendered from the Intellectual Property Trial and Appeal Board for corresponding KR Application No. 10-2017-0028109 dated Nov. 20, 2019.

* cited by examiner

ELECTROLYTE SOLUTIONS FOR HIGH ENERGY CATHODE MATERIALS AND METHODS FOR USE

CROSS-REFERENCE TO RELATED APPLICATIONS

This application is a continuation of U.S. patent application Ser. No. 14/220,062 now U.S. Pat. No. 9,236,634, entitled "Electrolyte Solutions for High Energy Cathode Materials and Methods for Use" which was filed on Mar. 19, 2014, which is a continuation of International Application No. PCT/US2014/028304 entitled "Electrolyte Solutions For High Energy Cathode Materials And Methods For Use" which was filed on Mar. 14, 2014, which claims priority to U.S. Provisional Application No. 61/786,633 entitled "Electrolyte Solutions For High Energy Cathode Materials And Methods For Use" which was filed on Mar. 15, 2013. This application claims priority to and the benefit of each of these applications, and each application is incorporated herein by reference in its entirety.

BACKGROUND OF THE INVENTION

The present invention is in the field of battery technology and, more particularly, in the area of additive compounds for use with high energy electrodes in electrochemical cells.

An electrolyte serves to transport ions and prevent electrical contact between electrodes in a battery. Organic carbonate-based electrolytes are most commonly used in lithium-ion ("Li-ion") batteries and, more recently, efforts have been made to develop new classes of electrolytes based on sulfones, silanes, and nitriles. Unfortunately, these conventional electrolytes typically cannot be operated at high voltages, since they are unstable above 4.3 V or other high voltages. At high voltages, conventional electrolytes can decompose, for example, by catalytic oxidation in the presence of cathode materials, to produce undesirable products that affect both the performance and safety of a battery. Conventional electrolytes may be degraded by reduction by the electrodes when the cells are charged.

As described in more detail below, solvents, salts, or additives have been incorporated into the electrolyte to decompose to form a protective film called a solid electrolyte interphase (SEI). Depending on the exact chemical system, this film can be composed of organic or inorganic lithium salts, organic molecules, oligomers, or polymers. Often, several components of the electrolyte are involved in the formation of the SEI (e.g. lithium salt, solvent, and additives). As a result, depending on the rate of decomposition of the different components, the SEI can be more or less homogenous.

In past research, organic compounds containing polymerizable functional groups such as alkenes, furan, thiophene, and pyrole had been reported to form an SEI on the cathode of lithium ion batteries. See, e.g., Y.-S. Lee et al., Journal of Power Sources 196 (2011) 6997-7001. These additives likely undergo polymerization during cell charging to form passivation films on the electrodes. The improvement in cell performance using these materials was slight.

Further, certain organic polymers have also been used as bulk electrolyte solvents for lithium ion batteries due to the generally superior chemical stability of polymeric-based solvents as compared to smaller organic molecules, such as organic carbonates. However, practical application of such systems has been limited due to poor ionic conductivity.

For high energy cathode materials, electrolyte stability remains a challenge. Recently, the need for higher performance and high capacity lithium ion secondary batteries used for power sources is dramatically increasing. Lithium transition metal oxides such as $LiCoO_2$ ("LCO") and $LiNi_{0.33}Mn_{0.33}Co_{0.33}O_2$ ("NMC") are state-of-the-art high energy cathode materials used in commercial batteries. Yet only about 50% of the theoretical capacity of LCO or NMC cathodes can be used with stable cycle life. To obtain the higher capacity, batteries containing these high energy materials need to be operated at higher voltages, such as voltages up to about 4.7V. However, above about 4.3V, conventional electrolytes degrade and this leads to a significant deterioration of the cycle life. Further, the decomposition of the electrolyte at higher voltages can generate gas (such as $CO_2$, $O_2$, ethylene, $H_2$) and acidic products, both of which can damage a battery.

As disclosed herein, these challenges and others are addressed in high energy lithium ion secondary batteries including cathode active materials that are capable of operation at high voltages (at least about 4.3V) with a carbon-based anode.

BRIEF SUMMARY OF THE INVENTION

Certain embodiments relate to a battery including an anode, a cathode, and an electrolyte including a lithium salt, a non-aqueous solvent, and a polymeric additive compound. The cathode material can be an NMC material.

Certain embodiments include methods making, using, and conditioning such batteries for use.

Other aspects and embodiments of the invention are also contemplated. The foregoing summary and the following detailed description are not meant to restrict the invention to any particular embodiment but are merely meant to describe some embodiments of the invention.

DETAILED DESCRIPTION OF THE INVENTION

Figure 1:
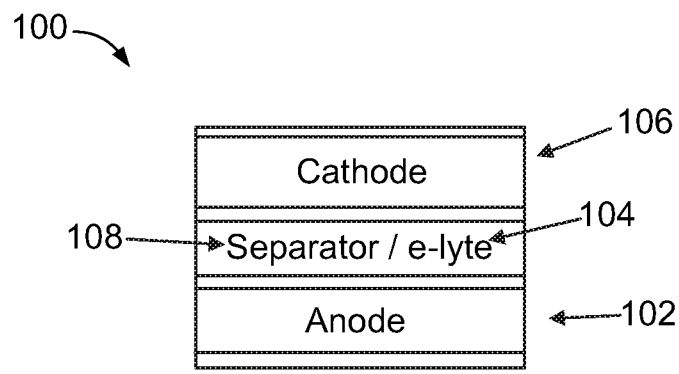
FIG. 1 illustrates a Li-ion battery implemented in accordance with an embodiment of the invention.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

The term "specific capacity" refers to the amount (e.g., total or maximum amount) of electrons or lithium ions a material is able to hold (or discharge) per unit mass and can be expressed in units of mAh/g. In certain aspects and embodiments, specific capacity can be measured in a constant current discharge (or charge) analysis, which includes discharge (or charge) at a defined rate over a defined voltage range against a defined counterelectrode. For example, specific capacity can be measured upon discharge at a rate of about 0.05 C (e.g., about 8.75 mA/g) from 4.45 V to 3.0 V versus a Li/Li+ counterelectrode. Other discharge rates and other voltage ranges also can be used, such as a rate of about 0.1 C (e.g., about 17.5 mA/g), or about 0.5 C (e.g., about 87.5 mA/g), or about 1.0 C (e.g., about 175 mA/g).

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "rated charge voltage" refers to an upper end of a voltage range during operation of a battery, such as a maximum voltage during charging, discharging, and/or cycling of the battery. In some aspects and some embodiments, a rated charge voltage refers to a maximum voltage upon charging a battery from a substantially fully discharged state through its (maximum) specific capacity at an initial cycle, such as the $1^{st}$ cycle, the $2^{nd}$ cycle, or the $3^{rd}$ cycle. In some aspects and some embodiments, a rated charge voltage refers to a maximum voltage during operation of a battery to substantially maintain one or more of its performance characteristics, such as one or more of coulombic efficiency, retention of specific capacity, retention of energy density, and rate capability.

The term "rated cut-off voltage" refers to a lower end of a voltage range during operation of a battery, such as a minimum voltage during charging, discharging, and/or cycling of the battery. In some aspects and some embodiments, a rated cut-off voltage refers to a minimum voltage upon discharging a battery from a substantially fully charged state through its (maximum) specific capacity at an initial cycle, such as the $1^{st}$ cycle, the $2^{nd}$ cycle, or the $3^{rd}$ cycle, and, in such aspects and embodiments, a rated cut-off voltage also can be referred to as a rated discharge voltage. In some aspects and some embodiments, a rated cut-off voltage refers to a minimum voltage during operation of a battery to substantially maintain one or more of its performance characteristics, such as one or more of coulombic efficiency, retention of specific capacity, retention of energy density, and rate capability.

The "maximum voltage" refers to the voltage at which both the anode and the cathode are fully charged. In an electrochemical cell, each electrode may have a given specific capacity and one of the electrodes will be the limiting electrode such that one electrode will be fully charged and the other will be as fully charged as it can be for that specific pairing of electrodes. The process of matching the specific capacities of the electrodes to achieve the desired capacity of the electrochemical cell is "capacity matching."

The term "LCO" refers generally to cathode materials containing $LiCo_xO_y$, and includes, but is not limited to, cathode materials containing $LiCoO_2$.

The term "NMC" refers generally to cathode materials containing $LiNi_xMn_yCo_zO_w$ and includes, but is not limited to, cathode materials containing $LiNi_{0.33}Mn_{0.33}Co_{0.33}O_2$.

To the extent certain battery characteristics can vary with temperature, such characteristics are specified at room temperature (about 30 degrees C.), unless the context clearly dictates otherwise.

Ranges presented herein are inclusive of their endpoints. Thus, for example, the range 1 to 3 includes the values 1 and 3 as well as intermediate values.

FIG. 1 illustrates a Li-ion battery 100 implemented in accordance with an embodiment of the invention. The battery 100 includes an anode 102, a cathode 106, and a separator 108 that is disposed between the anode 102 and the cathode 106. In the illustrated embodiment, the battery 100 also includes a high voltage electrolyte 104, which is disposed between the anode 102 and the cathode 106 and remains stable during high voltage battery cycling.

The operation of the battery 100 is based upon reversible intercalation and de-intercalation of Li ions into and from host materials of the anode 102 and the cathode 106. Other implementations of the battery 100 are contemplated, such as those based on conversion chemistry. Referring to FIG. 1, the voltage of the battery 100 is based on redox potentials of the anode 102 and the cathode 106, where Li ions are accommodated or released at a lower potential in the former and a higher potential in the latter. To allow both a higher energy density and a higher voltage platform to deliver that energy, the cathode 106 includes an active cathode material for high voltage operations at or above 4.3 V.

Examples of suitable high voltage cathode materials include phosphates, fluorophosphates, fluorosulphates, fluorosilicates, spinels, Li-rich layered oxides, and composite layered oxides. Further examples of suitable cathode materials include: spinel structure lithium metal oxides, layered structure lithium metal oxides, lithium-rich layered structured lithium metal oxides, lithium metal silicates, lithium metal phosphates, metal fluorides, metal oxides, sulfur, and metal sulfides. Examples of suitable anode materials include conventional anode materials used in Li-ion batteries, such as lithium, graphite ("$Li_xC_6$"), and other carbon, silicate, or oxide-based anode materials.

Figure 2:
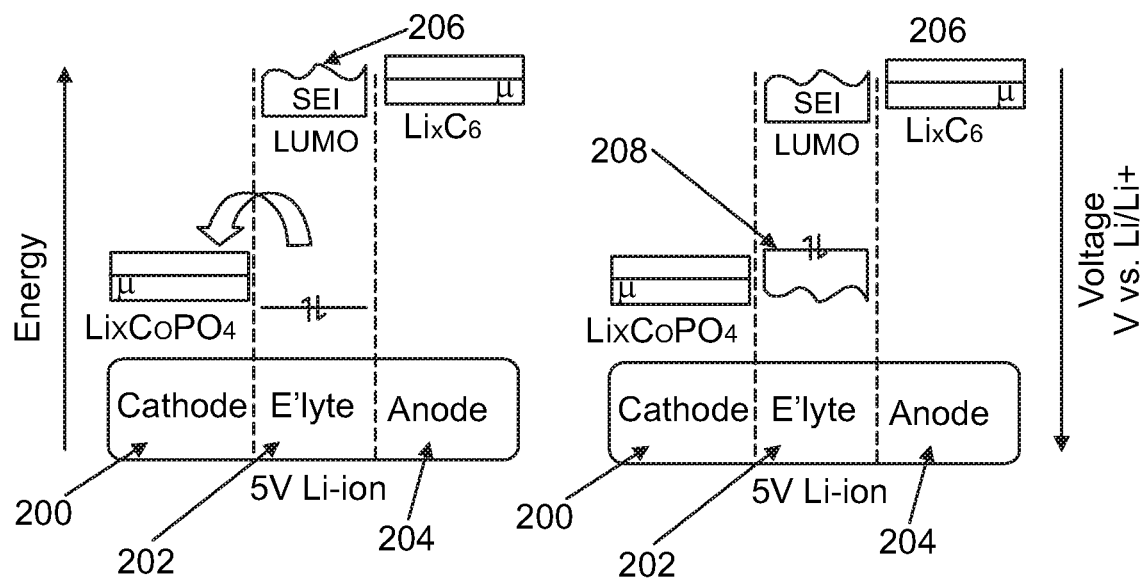
FIG. 2 illustrates the operation of a Li-ion battery and a graphical representation of an illustrative non-limiting mechanism of action of an electrolyte including an additive compound, according to an embodiment of the invention.

FIG. 2 illustrates operation of a Li-ion battery and an illustrative, non-limiting mechanism of action of an improved electrolyte, according to an embodiment of the invention. Without being bound by a particular theory not recited in the claims, the inclusion of one or more stabilizing additive compounds in an electrolyte solution can, upon operation of the battery (e.g., during conditioning thereof), passivate a high voltage cathode material, thereby reducing or preventing reactions between bulk electrolyte components and the cathode material that can degrade battery performance.

Referring to FIG. 2, an electrolyte 202 includes a base electrolyte, and, during initial battery cycling, components within the base electrolyte can assist in the in-situ formation of a protective film (in the form of a solid electrolyte interface ("SEI") 206) on or next to an anode 204. The anode SEI 206 can inhibit reductive decomposition of the high voltage electrolyte 202. Preferably, and without being bound by theory not recited in the claims, for operation at voltages at or above 4.2 V, the electrolyte 202 can also include additives that can assist in the in-situ formation of a protective film (in the form of a SEI 208 or another derivative) on or next to a cathode 200. The cathode SEI 208 can inhibit oxidative decomposition of the high voltage electrolyte 202 that can otherwise occur during high voltage operations. As such, the cathode SEI 208 can inhibit oxidative reactions in a counterpart manner to the inhibition of reductive reactions by the anode SEI 206. In the illustrated embodiment, the cathode SEI 208 can have a thickness in the sub-micron range, and can include one or more chemical elements corresponding to, or derived from, those present in one or more additives, such as silicon or other heteroatom included in one or more additives. Advantageously, one or more additives can preferentially passivate the cathode 200 and can selectively contribute towards film formation on the cathode 200, rather than the anode 204. Such preferential or selective film formation on the cathode 200 can impart stability against oxidative decomposition, with little or no additional film formation on the anode 204 (beyond the anode SEI 206) that can otherwise degrade battery performance through resistive losses. More generally, one or more additives can decompose below a redox potential of the cathode material and above a redox potential of SEI formation on the anode 204.

Without being bound by a particular theory not recited in the claims, the formation of the cathode SEI 208 can occur through one or more of the following mechanisms: (1) the additive compound(s) can decompose to form the cathode SEI 208, which inhibits further oxidative decomposition of electrolyte components; (2) the additive compound(s) or its decomposed product(s) form or improve the quality of a passivation film on the cathode or anode; (3) the additive compounds can form an intermediate product, such as a complex with $LiPF_6$ or a cathode material, which intermediate product then decomposes to form the cathode SEI 208 that inhibits further oxidative decomposition of electrolyte components; (4) the additive compounds can form an intermediate product, such as a complex with $LiPF_6$, which then decomposes during initial charging. The resulting decomposition product can then further decompose during initial charging to form the cathode SEI 208, which inhibits further oxidative decomposition of electrolyte components; (5) the additive compounds can stabilize the cathode material by preventing metal ion dissolution.

Other mechanisms of action of the electrolyte 202 are contemplated, according to an embodiment of the invention. For example, and in place of, or in combination with, forming or improving the quality of the cathode SEI 208, one or more additives or a derivative thereof (e.g., their decomposition product) can form or improve the quality of the anode SEI 206, such as to reduce the resistance for Li ion diffusion through the anode SEI 206. As another example, one or more additives or a derivative thereof (e.g., their decomposition product) can improve the stability of the electrolyte 202 by chemically reacting or forming a complex with other electrolyte components. As a further example, one or more additives or a derivative thereof (e.g., their decomposition product) can scavenge decomposition products of other electrolyte components or dissolved electrode materials in the electrolyte 202 by chemical reaction or complex formation. Any one or more of the cathode SEI 208, the anode SEI 206, and the other decomposition products or complexes can be viewed as derivatives, which can include one or more chemical elements corresponding to, or derived from, those present in one or more additives, such as a heteroatom included in the additives.

Certain embodiments are related to a class of polymeric additives for non-aqueous electrolytes. Such embodiments include several electrolyte additives that improve the oxidative stability of the electrolyte and the cycle life and coulombic efficiency of electrochemical cells containing these additives.

A high voltage electrolyte according to some embodiments of the invention can be formed with reference to the formula:

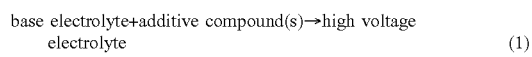  (1)

A high temperature electrolyte according to some embodiments of the invention can be formed with reference to the formula:

$$\text{base electrolyte} + \text{additive compound(s)} \rightarrow \text{high temperature electrolyte} \quad (2)$$

In formulas (1) and (2), the base electrolyte can include a set of solvents and a set of salts, such as a set of Li-containing salts in the case of Li-ion batteries. Examples of suitable solvents include nonaqueous electrolyte solvents for use in Li-ion batteries, including carbonates, such as ethylene carbonate, dimethyl carbonate, ethyl methyl carbonate, propylene carbonate, methyl propyl carbonate, and diethyl carbonate; sulfones; silanes; nitriles; esters; ethers; and combinations thereof.

Referring to formulas (1) and (2), an amount of a particular compound can be expressed in terms of a weight percent of the compound relative to a total weight of the electrolyte solution (or wt. %). For example, an amount of a compound can be in the range of about 0.01 wt. % to about 30 wt. %, such as from about 0.05 wt. % to about 30 wt. %, from about 0.01 wt. % to about 20 wt. %, from about 0.2 wt. % to about 15 wt. %, from about 0.2 wt. % to about 10 wt. %, from about 0.2 wt. % to about 5 wt. %, or from about 0.2 wt. % to about 1 wt. %, and, in the case of a combination of multiple compounds, a total amount of the compounds can be in the range of about 0.01 wt. % to about 30 wt. %, such as from about 0.05 wt. % to about 30 wt. %, from about 0.01 wt. % to about 20 wt. %, from about 0.2 wt. % to about 15 wt. %, from about 0.2 wt. % to about 10 wt. %, from about 0.2 wt. % to about 5 wt. %, or from about 0.2 wt. % to about 1 wt. %. An amount of a compound also can be expressed in terms of a ratio of the number of moles of the compound per unit surface area of either, or both, electrode materials. For example, an amount of a compound can be in the range of about $10^{-7}$ mol/m$^2$ to about $10^{-2}$ mol/m$^2$, such as from about $10^{-7}$ mol/m$^2$ to about $10^{-5}$ mol/m$^2$, from about $10^{-5}$ mol/m$^2$ to about $10^{-3}$ mol/m$^2$, from about $10^{-6}$ mol/m$^2$ to about $10^{-4}$ mol/m$^2$, or from about $10^{-4}$ mol/m$^2$ to about $10^{-2}$ mol/m$^2$. As further described below, a compound can be consumed or can react, decompose, or undergo other modifications during initial battery cycling. As such, an amount of a compound can refer to an initial amount of the compound used during the formation of the electrolyte solutions according to formulas (1) or (2), or can refer to an initial amount of the additive within the electrolyte solution prior to battery cycling (or prior to any significant amount of battery cycling).

Resulting performance characteristics of a battery can depend upon the identity of a particular compound used to form the high voltage electrolyte according to formulas (1) or (2), an amount of the compound used, and, in the case of a combination of multiple compounds, a relative amount of each compound within the combination. Accordingly, the resulting performance characteristics can be fine-tuned or optimized by proper selection of the compounds and adjusting amounts of the compounds in formulas (1) or (2).

The formation according to formulas (1) or (2) can be carried out using a variety of techniques, such as by mixing the base electrolyte and the additives, dispersing the additives within the base electrolyte, dissolving the additives within the base electrolyte, or otherwise placing these components in contact with one another. The additives can be provided in a liquid form, a powdered form (or another solid form), or a combination thereof. The additives can be incorporated in the electrolyte solutions of formulas (1) or (2) prior to, during, or subsequent to battery assembly.

The electrolyte solutions described herein can be used for a variety of batteries containing a high voltage cathode or a low voltage cathode, and in batteries operated at high temperatures. For example, the electrolyte solutions can be substituted in place of, or used in conjunction with, conventional electrolytes for Li-ion batteries for operations at or above 4.3 V. In particular, these additives are useful for Li-ion batteries containing LCO or NMC cathode materials.

Batteries including the electrolyte solutions can be conditioned by cycling prior to commercial sale or use in commerce. Such conditioning can include, for example, providing a battery, and cycling such battery through at least 1, at least 2, at least 3, at least 4, or at least 5 cycles, each cycle including charging the battery and discharging the battery at a rate of 0.05 C (e.g., a current of 8.75 mA/g) between 4.45 V and 3.0 V (or another voltage range) versus a reference counterelectrode, such as a graphite anode. Charging and discharging can be carried out at a higher or lower rate, such as at a rate of 0.1 C (e.g., a current of 17.5 mA/g), at a rate of 0.5 C (e.g., a current of 87.5 mA/g), or at a rate of 10 (e.g., a current of 175 mA/g). Typically a battery is conditioned with 1 cycle by charging at 0.05 C rate to 4.45 V followed by applying constant voltage until the current reaches 0.02 C, and then discharging at 0.05 C rate to 3V.

The polymer-based additives according to embodiments herein are molecules formed from numerous repeated monomer units, as is conventionally understood in the art. Such polymer-based additives may contain various functional groups attached to the polymer chain. Certain properties are preferred in polymer-based additives for use in batteries. For example, the additives preferably are: (i) soluble in the electrolyte solvent (that is, they are sufficiently polar as compared to the solvent and sufficiently low molecular weight); (ii) either chemically resistant to oxidation and/or reduction under the cell conditions or, if not chemically resistant to oxidation and/or reduction, then the additives should decompose to intermediates or products that form a stable SEI film on the anode, cathode, or both; and (iii) sufficiently low molecular weight to be soluble in electrolyte solution at room temperature and to make the electrolyte solution viscosity not worse than without the additive.

Certain polymer-based additives demonstrate the properties listed above, including: poly(9-vinylcarbazole); poly(methyl vinyl ether-alt-maleic anhydride); poly(oxy-1,4-phenylenesulfonyl-1,4-phenylene); poly(1-hexadecene-sulfone); poly(hexafluoropropylene oxide); poly(bis(4-(ethoxycarbonyl)phenoxy)phosphazene); and combinations thereof.

These polymer additives are soluble in the conventional electrolyte and have functional groups that contribute to stable SEI formation. These polymer additives can form more mechanically and chemically stable SEI films compared with molecular or short-chain oligomers. These polymer additives significantly improve cycle life in a full cell configuration. Importantly, these polymer additives show superior performance when compared to their monomer analogues, which indicates that incorporation of the functional groups into a polymer background is responsible for the improved performance. That is, the functional groups alone, in a non-polymeric structure, do not deliver the levels of performance achieved using their polymeric equivalents.

Several tests were conducted on full cells constructed according to the methods described below. The battery cell was cycled between 3 V to 4.45 V, or in some cases to about 4.65V, at 30° C. Capacity, coulombic efficiency, discharge rate performance, and cycle life were evaluated. From these tests the following performance improvements were observed:

TABLE 1

Summary of performance of polymer additives

| Polymer Additives | Capacity (mAh/g, cy1) | Coulombic Efficiency (%, cy1) | Discharge Rate Performance (1 C/0.1 C, %) | Cycle life (%, cy99) |
|---|---|---|---|---|
| 0.5% PVC | 168 | 78 | 98 | 85 |
| 2% PMVEAMA | 171 | 80 | 95 | 83 |
| 2% POPSP | 169 | 79 | 95 | 86 |
| 0.5% PHDS | 175 | 79 | 94 | 83 |
| 2% PHFPO | 175 | 80 | 94 | 81 |
| Control | 174 | 78 | 94 | 72 |

Figure 3:
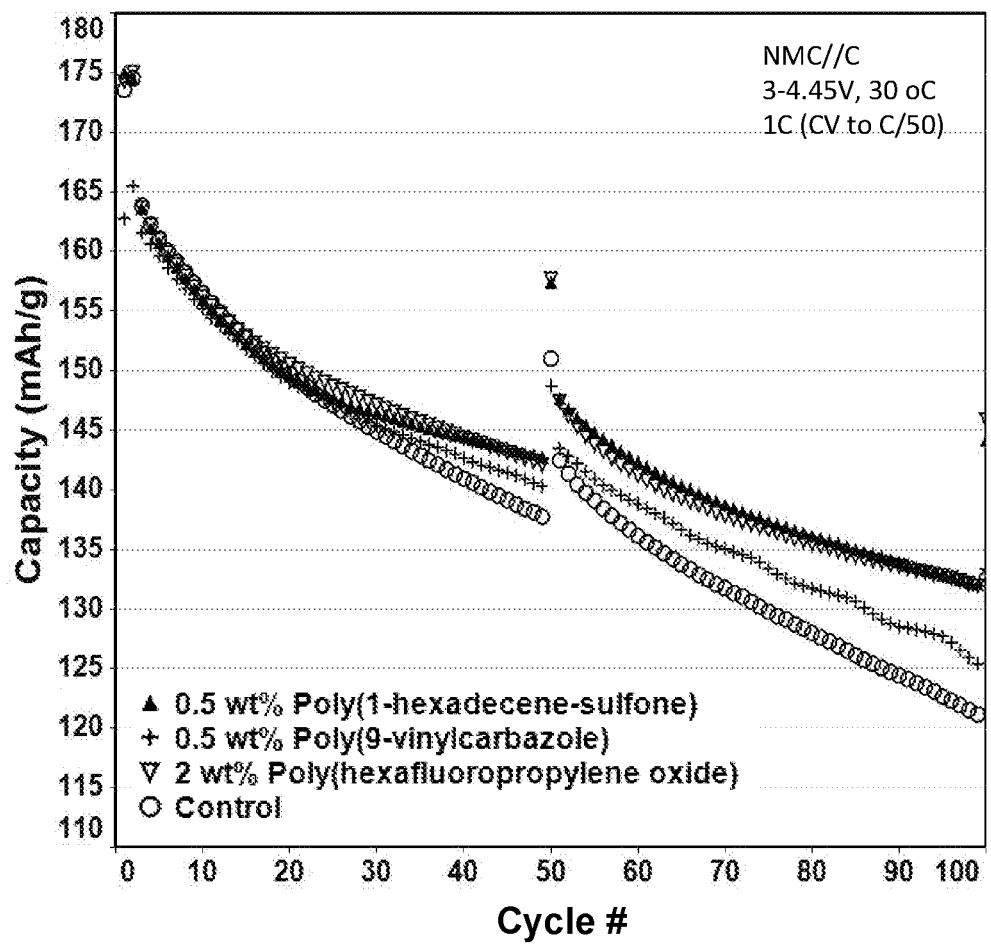
FIG. 3 illustrates characterization of the specific capacity versus cycle in NMC full cells using an activated carbon anode and electrolytes including an additive compound, according to an embodiment of the invention, as compared to a control electrolyte.

FIG. 3 illustrates characterization of the specific capacity versus cycle in NMC full cells using an activated carbon anode. The control is a commercial carbonate electrolyte (empty circle). All three additives demonstrate superior performance as compared to the commercial electrolyte. 0.5 wt % poly(1-hexadecene-sulfone) added to commercial electrolyte (solid triangle), 0.5 wt % poly(9-vinylcarbazole) added to commercial electrolyte (cross), and or 2 wt % poly(hexafluoropropylene oxide) added to commercial electrolyte (empty triangle) all demonstrate higher capacity at high cycles numbers than the control.

Figure 4:
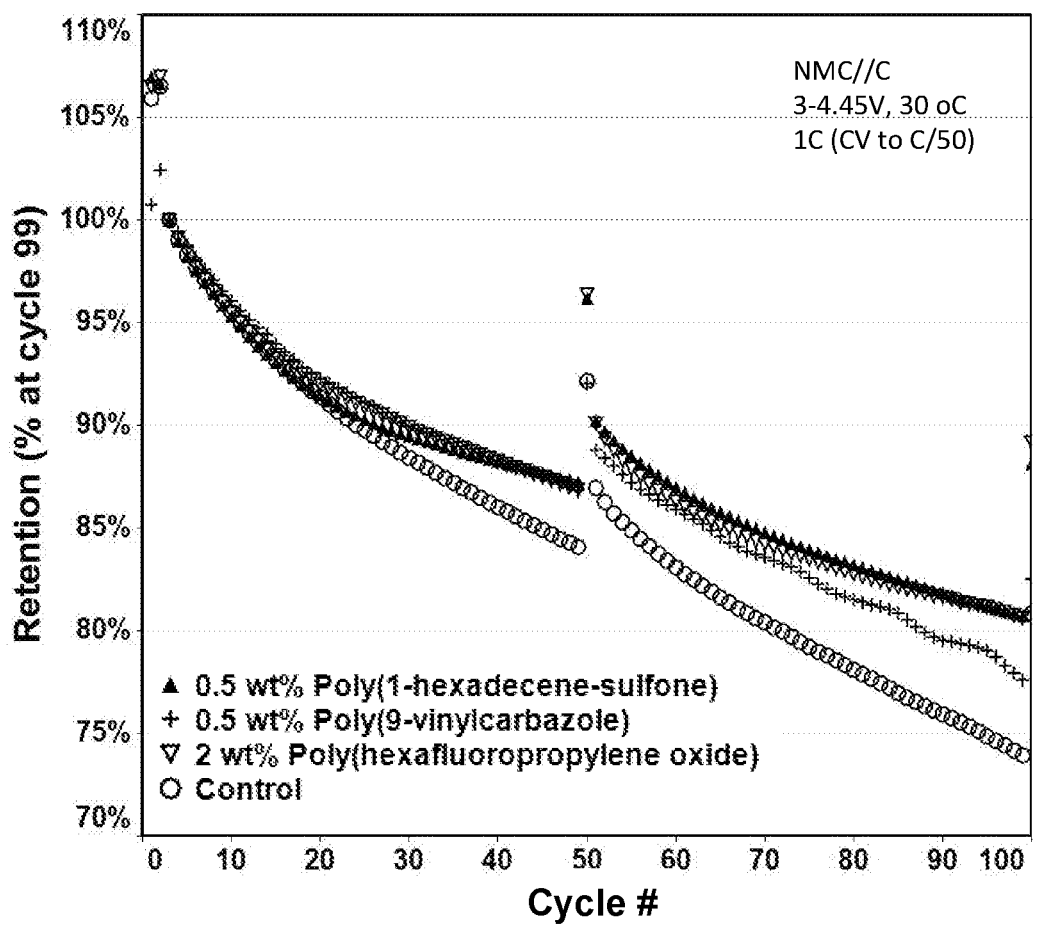
FIG. 4 illustrates characterization of the capacity retention versus cycle in NMC full cells using an activated carbon anode and electrolytes including an additive compound, according to an embodiment of the invention, as compared to a control electrolyte.

FIG. 4 illustrates characterization of the capacity retention versus cycle in NMC full cells using an activated carbon anode. The control is a commercial carbonate electrolyte (empty circle). All three additives demonstrate superior performance as compared to the commercial electrolyte. 0.5 wt % poly(1-hexadecene-sulfone) added to commercial electrolyte (solid triangle), 0.5 wt % poly(9-vinylcarbazole) added to commercial electrolyte (cross), and or 2 wt % poly(hexafluoropropylene oxide) added to commercial electrolyte (empty triangle) all demonstrate higher capacity at high cycles numbers than the control.

Figure 5:
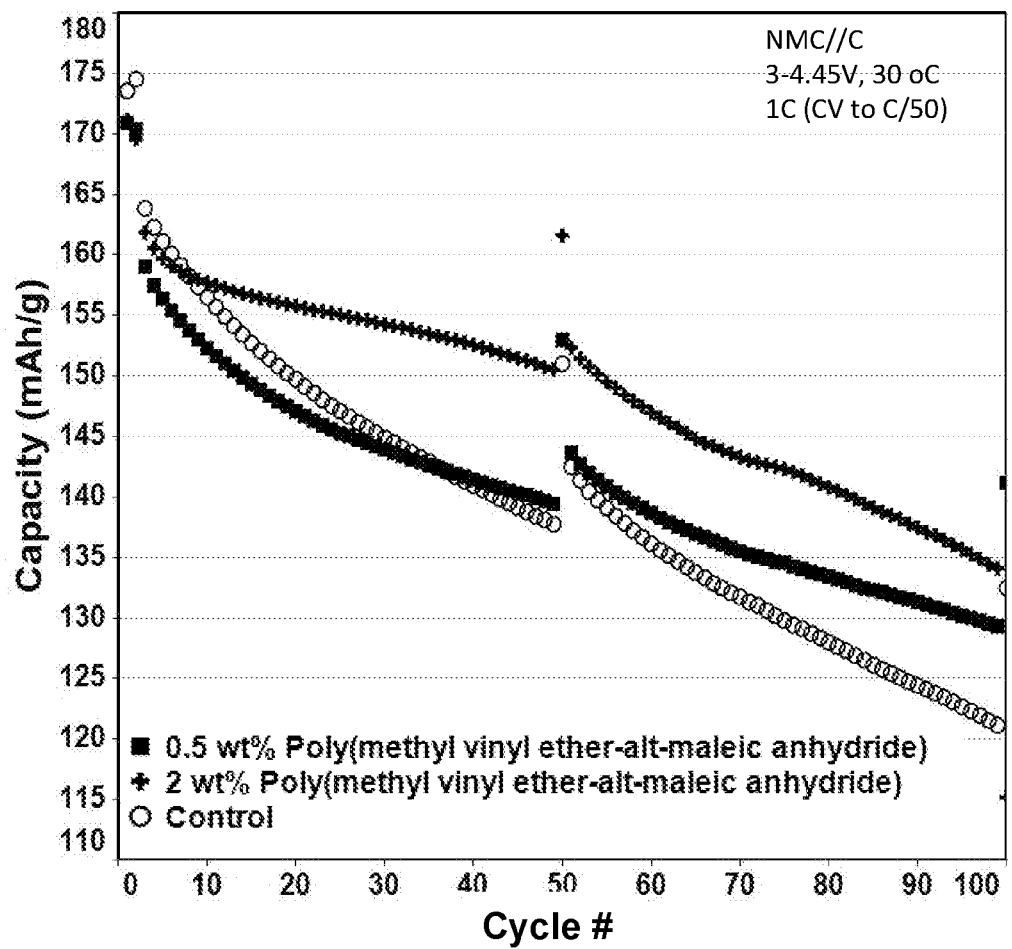
FIG. 5 illustrates characterization of the specific capacity versus cycle in NMC full cells using an activated carbon anode and electrolytes including an additive compound, according to an embodiment of the invention, as compared to a control electrolyte.

FIG. 5 illustrates characterization of the specific capacity versus cycle in NMC full cells using an activated carbon anode. The control is a commercial carbonate electrolyte (empty circle). Poly(methyl vinyl ether-alt-maleic anhydride) demonstrates superior performance as compared to the commercial electrolyte at both 0.5 wt % added to commercial electrolyte (solid square) and 2 wt % added to commercial electrolyte (solid cross).

Figure 6:
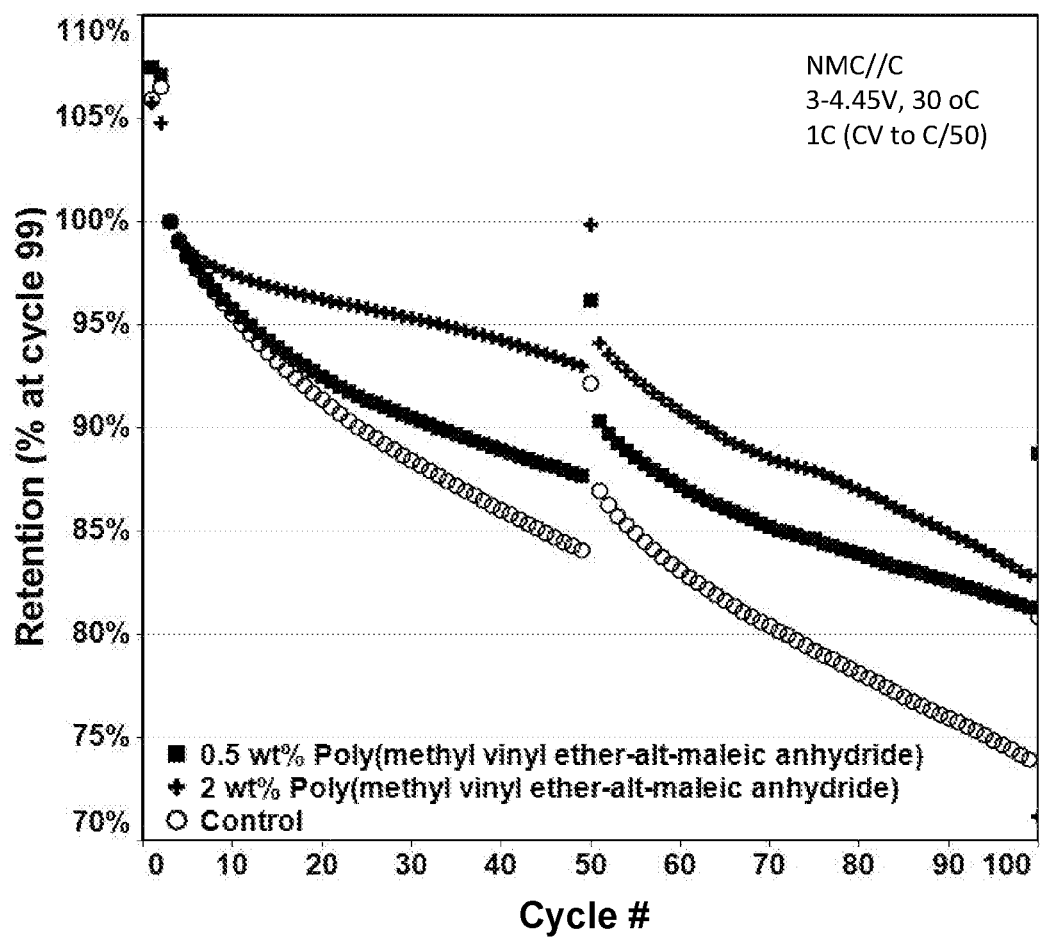
FIG. 6 illustrates characterization of the capacity retention versus cycle in NMC full cells using an activated carbon anode and electrolytes including an additive compound, according to an embodiment of the invention, as compared to a control electrolyte.

FIG. 6 illustrates characterization of the capacity retention versus cycle in NMC full cells using an activated carbon anode. The control is a commercial carbonate electrolyte (empty circle). Poly(methyl vinyl ether-alt-maleic anhydride) demonstrates superior performance as compared to the commercial electrolyte at both 0.5 wt % added to commercial electrolyte (solid square) and 2 wt % added to commercial electrolyte (solid cross).

Figure 7:
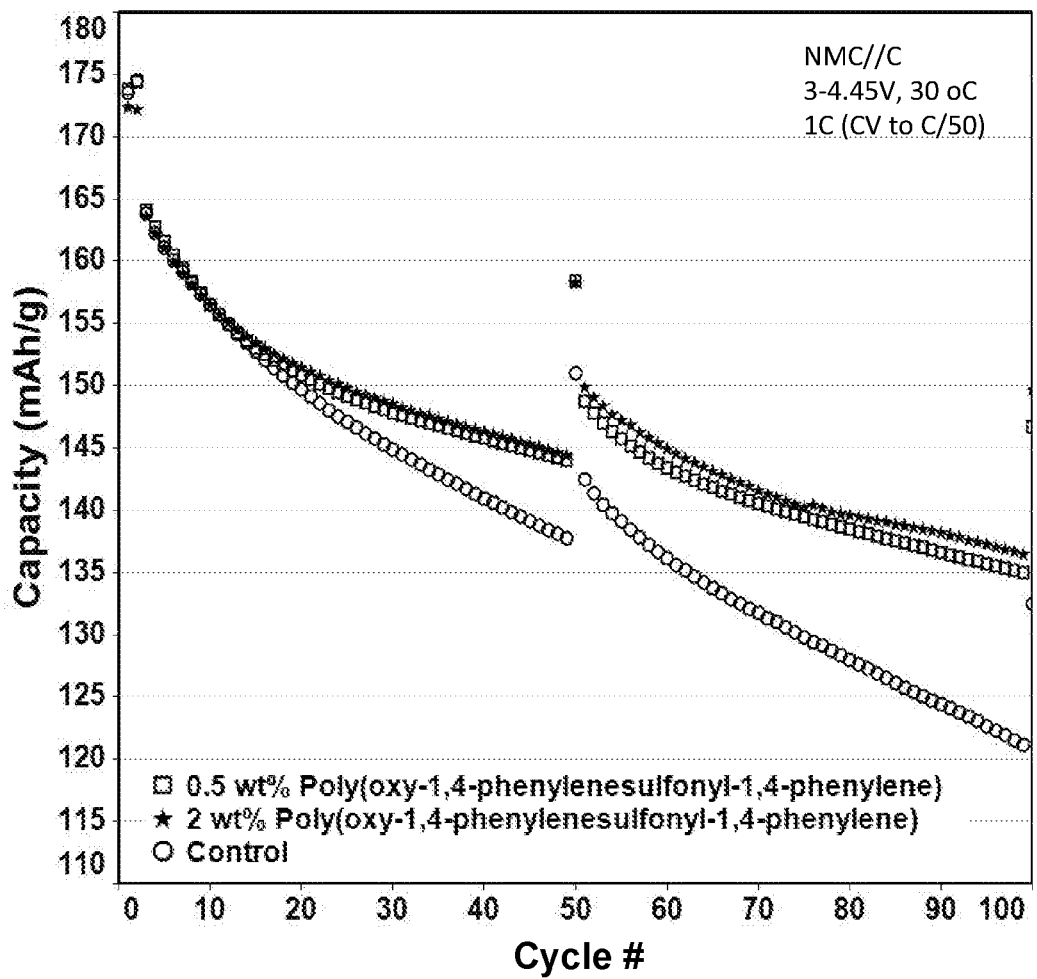
FIG. 7 illustrates characterization of the specific capacity versus cycle in NMC full cells using an activated carbon anode and electrolytes including an additive compound, according to an embodiment of the invention, as compared to a control electrolyte.

FIG. 7 illustrates characterization of the specific capacity versus cycle in NMC full cells using an activated carbon anode. The control is a commercial carbonate electrolyte (empty circle). Poly(oxy-1,4-phenylenesulfonyl-1,4-phenylene) demonstrates superior performance as compared to the commercial electrolyte at both 0.5 wt % added to commercial electrolyte (empty square) and 2 wt % added to commercial electrolyte (solid star).

Figure 8:
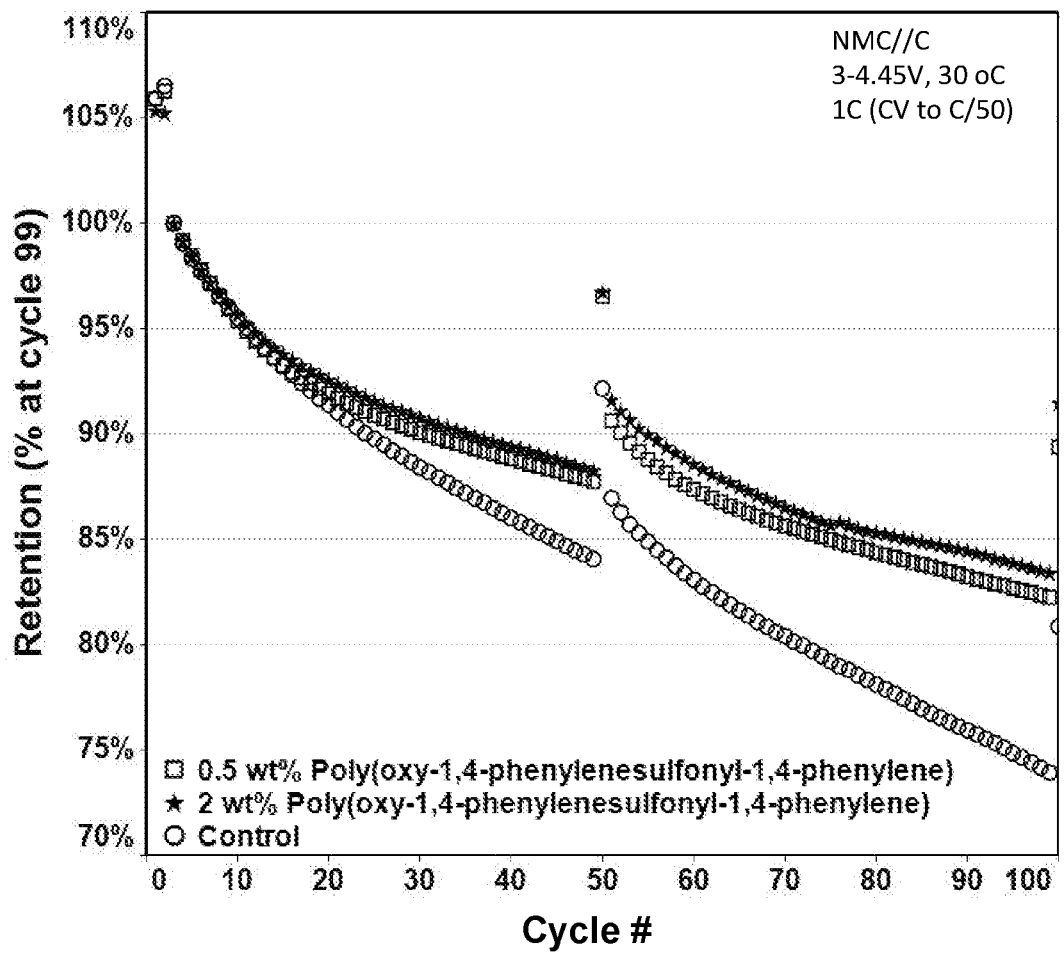
FIG. 8 illustrates characterization of the capacity retention versus cycle in NMC full cells using an activated carbon anode and electrolytes including an additive compound, according to an embodiment of the invention, as compared to a control electrolyte.

FIG. 8 illustrates characterization of the capacity retention versus cycle in NMC full cells using an activated carbon anode. The control is a commercial carbonate electrolyte (empty circle). Poly(oxy-1,4-phenylenesulfonyl-1,4-phenylene) demonstrates superior performance as compared to the commercial electrolyte at both 0.5 wt % added to commercial electrolyte (empty square) and 2 wt % added to commercial electrolyte (solid star).

To test whether the observed performance improvements were due to the specific functional groups without the polymer backbone or if the improvements were due to the polymer-based structure of the additives, poly(9-vinylcarbazole) and poly(oxy-1,4-phenylenesulfonyl-1,4-phenylene) were tested versus their monomeric analogues: 9-ethylcarbazole, 9-vinylcarbazole, and 4-methoxyphenyl phenyl sulfone.

Figure 9:
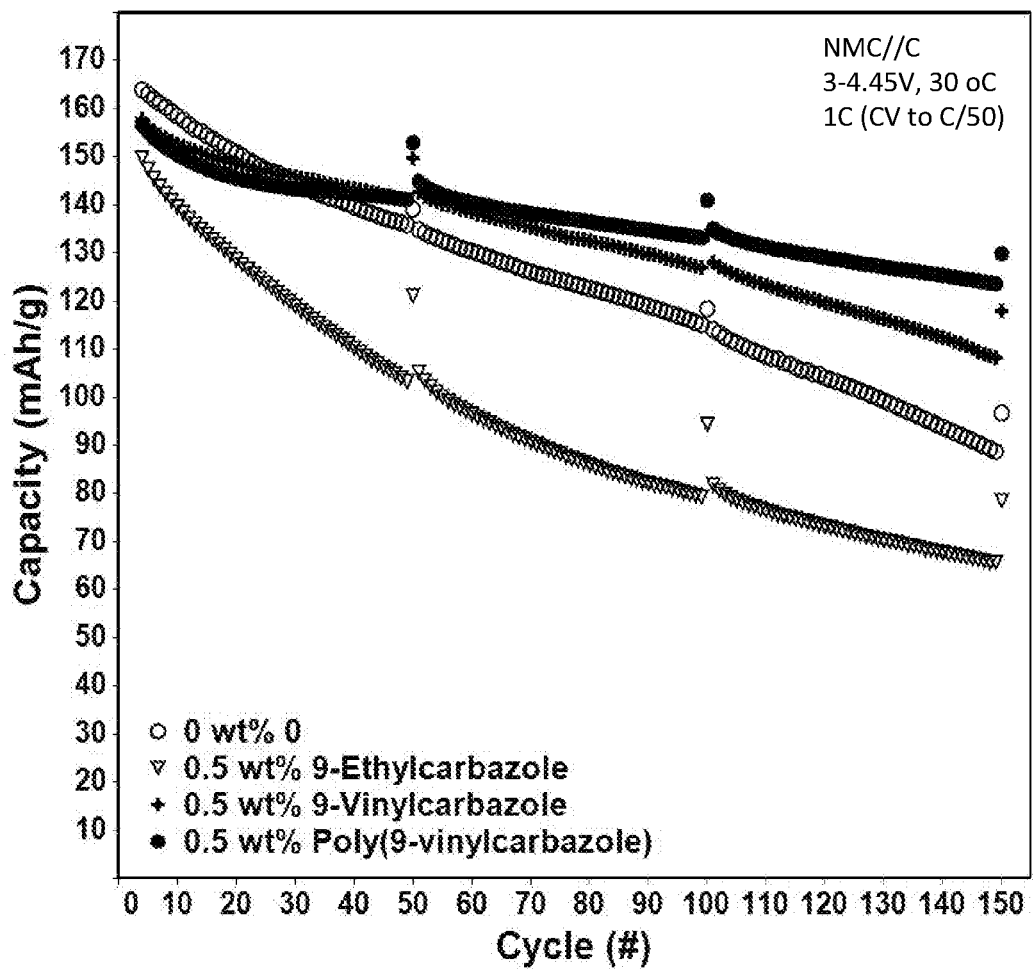
FIG. 9 illustrates characterization of the specific capacity versus cycle in NMC full cells using an activated carbon anode and electrolytes including an additive compound, according to an embodiment of the invention, as compared to a control electrolyte and an electrolyte with a small molecule additive.

FIG. 9 illustrates characterization of the specific capacity versus cycle in NMC full cells using an activated carbon anode. The polymer additives 0.5 wt % poly(9-vinylcarbazole) added to commercial electrolyte (solid circle) showed superior cycle life to 0.5 wt % 9-vinylcarbazole added to commercial electrolyte (cross). 9-vinylcarbazole is monomeric precursor of poly(9-vinylcarbazole). The polymer additives 0.5 wt % poly(9-vinylcarbazole) added to commercial electrolyte (solid circle) also showed superior cycle life to 0.5 wt % 9-ethylcarbazole added to commercial electrolyte (empty triangle) although two additives share the same functional group 9-ethylcarbazole.

Figure 10:
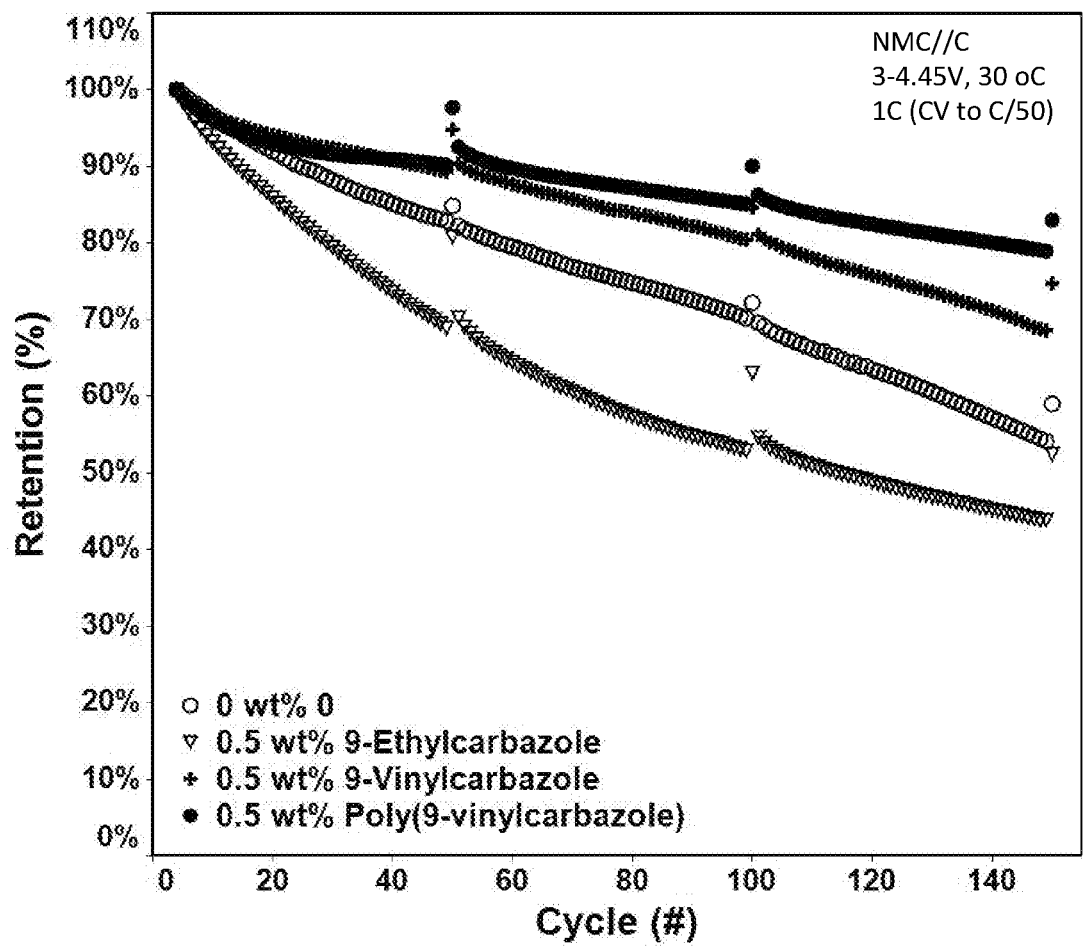
FIG. 10 illustrates characterization of the capacity retention versus cycle in NMC full cells using an activated carbon anode and electrolytes including an additive compound, according to an embodiment of the invention, as compared to a control electrolyte and an electrolyte with a small molecule additive.

FIG. 10 illustrates characterization of the capacity retention versus cycle in NMC full cells using an activated carbon anode. The polymer additives 0.5 wt % poly(9-vinylcarbazole) added to commercial electrolyte (solid circle) showed superior cycle life to 0.5 wt % 9-vinylcarbazole added to commercial electrolyte (cross). The polymer additives 0.5 wt % poly(9-vinylcarbazole) added to commercial electrolyte (solid circle) also showed superior cycle life to 0.5 wt % 9-ethylcarbazole added to commercial electrolyte (empty triangle).

These results indicate that presence of the polymeric backbone in these additives is important to the improved cycle performance. Notably, it was theorized that 9-vinylcarbazole would undergo polymerization reaction to form polycarbazole under electrochemical condition. This result indicates that preexisting polymeric chain of polymer additives can further improve the cycle life, possibly by forming a more robust and homogenous SEI. Thus, we demonstrated that polymer precursors do not improve performance like the preexisting polymer.

Figure 11:
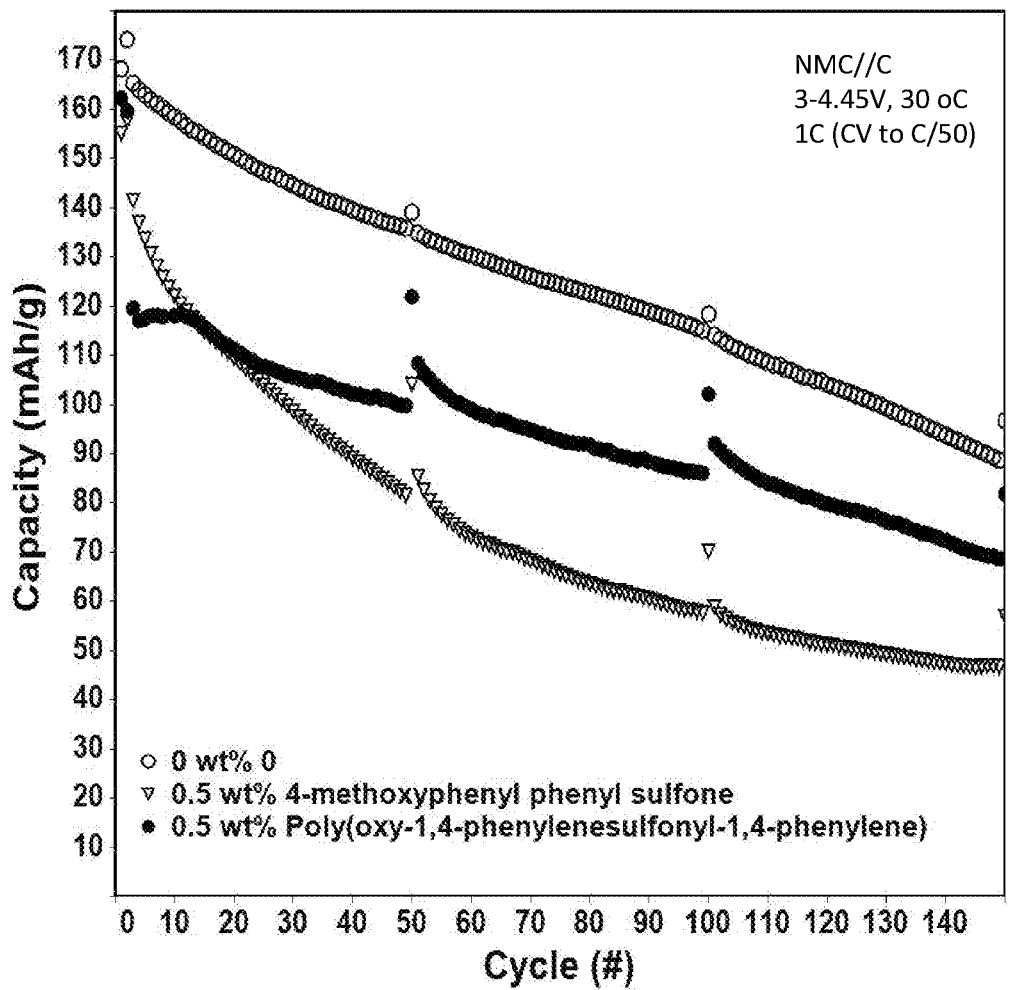
FIG. 11 illustrates characterization of the specific capacity versus cycle in NMC full cells using an activated carbon anode and electrolytes including an additive compound, according to an embodiment of the invention, as compared to a control electrolyte and an electrolyte with a small molecule additive.

FIG. 11 illustrates characterization of the specific capacity versus cycle in NMC full cells using an activated carbon anode. The polymer additives 0.5 wt % poly(oxy-1,4-phenylenesulfonyl-1,4-phenylene) added to commercial electrolyte (solid circle) showed superior cycle life to 0.5 wt % 4-methoxyphenyl phenyl sulfone added to commercial electrolyte (empty triangle). 4-methoxyphenyl phenyl sulfone is monomeric precursor of poly(oxy-1,4-phenylenesulfonyl-1,4-phenylene).

Figure 12:
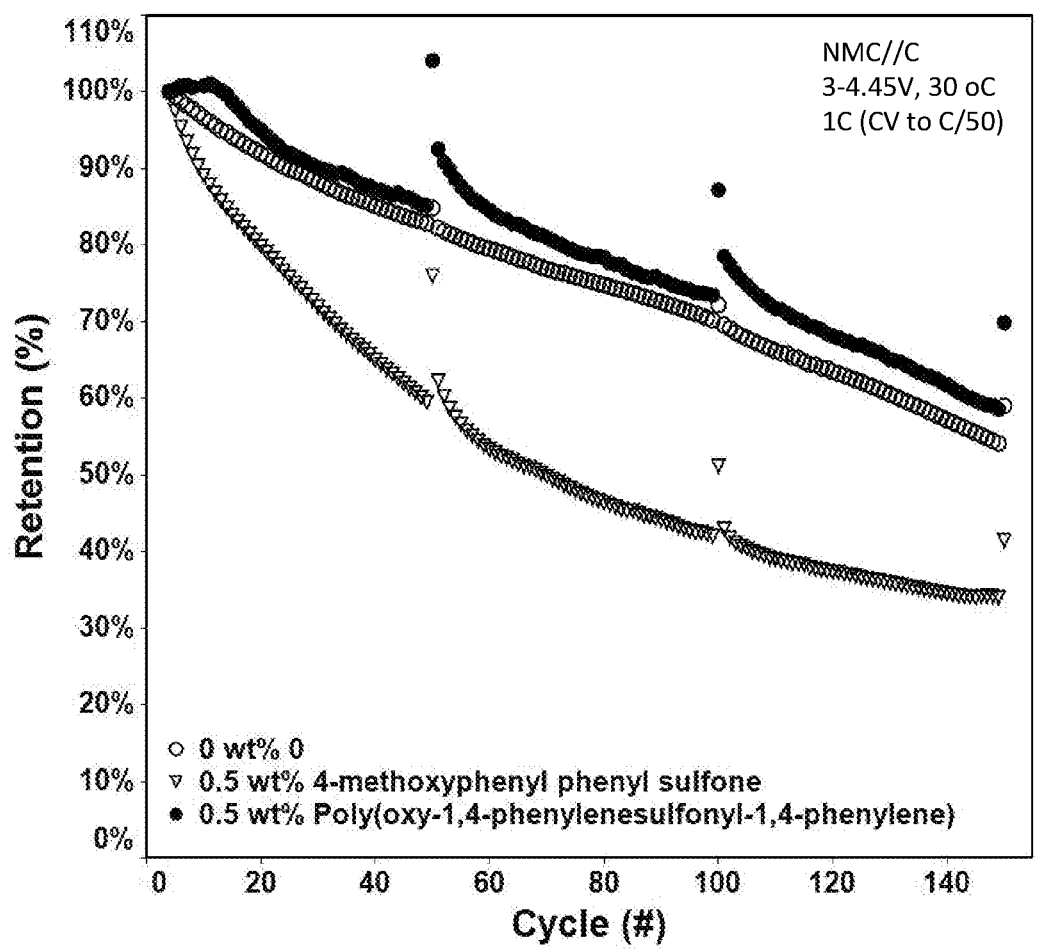
FIG. 12 illustrates characterization of the capacity retention versus cycle in NMC full cells using an activated carbon anode and electrolytes including an additive compound, according to an embodiment of the invention, as compared to a control electrolyte and an electrolyte with a small molecule additive.

FIG. 12 illustrates characterization of the capacity retention versus cycle in NMC full cells using an activated carbon anode. The polymer additives 0.5 wt % poly(oxy-1,4-phenylenesulfonyl-1,4-phenylene) added to commercial electrolyte (solid circle) showed superior cycle life to 0.5 wt % 4-methoxyphenyl phenyl sulfone added to commercial electrolyte (empty triangle).

In addressing the challenges of high energy cathode materials, the additives according to embodiments disclosed herein have a number of benefits, including: (i) large surface area, which allows the polymeric additives to strongly adsorb on to the surface of the electrodes before decomposition and potentially improving the quality and stability of the resulting SEI; (ii) mechanical and chemical stability as compared to organic oligomers and short-chain polymers formed from conventional solvents and additives due to the pre-formed polymer backbone; and (iii) homogenous dispersal of functional groups throughout the SEI film due to those functional groups being distributed along a polymeric backbone.

Further, additives according to embodiments described herein provided superior performance as compared to their related monomers or related small molecules with lesser molar concentration of additives. In the comparative experiments herein, the polymers and the monomers were compared at the same weight percentage, but the monomer was 100% functional group while some of the polymeric additive was polymer backbone and not functional group. Thus, less functional group provided better performance in the polymer-based additives.

In some embodiments, the additive is a polymer having at least one functional group selected from the group consisting of carbazoles, anhydrides, sulfones, fluorinated ethers, phosphazenes, esters, and combinations thereof.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

EXAMPLES

Battery cells were formed in a high purity Argon filled glove box (M-Braun, $O_2$ and humidity content <0.1 ppm). The electrodes were prepared by the following methods. (i) For the cathode, a commercial $LiNi_{0.33}Mn_{0.33}Co_{0.33}O_2$ cathode material was mixed with poly(vinylidene fluoride) (Sigma Aldrich) and carbon black (Super P Li, TIMCAL) with 1-methyl-2-pyrrolidinone (Sigma Aldrich) as solvent. The resulting slurry was deposited on an aluminum current collector and dried to form a composite cathode film. (ii) For the anode, a graphitic carbon (G5) was mixed with poly (vinylidene fluoride) (Sigma Aldrich) and carbon black (Super P Li, TIMCAL) with 1-methyl-2-pyrrolidinone (Sigma Aldrich) as solvent. The resulting slurry was deposited on a copper current collector and dried to form a composite cathode film. Each battery cell included the composite cathode film, a polypropylene separator, and the composite anode film. A conventional electrolyte was mixed with a given electrolyte additive and added to the battery cell. The battery cell was sealed and cycled between 3 V to 4.45 V, or even at 4.65V, at 30 degrees C.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A battery capable of several cycles of charging and discharging comprising:
   an anode;
   a cathode; and
   a liquid electrolyte comprising a lithium salt, a non-aqueous solvent, and a polymeric additive, wherein the polymeric additive includes poly(bis(4-(ethoxycarbonyl)phenoxy)phosphazene and is soluble in the non-aqueous solvent at 30° C.

2. The battery of claim 1 wherein a concentration of the polymeric additive is no less than 0.2 weight percent and no greater than 10 weight percent of a total weight of the liquid electrolyte.

3. The battery of claim 1 wherein the battery is characterized by a rated charge voltage greater than about 4.2 V.

4. The battery of claim 1 wherein the battery is characterized by a rated charge voltage greater than about 4.5 V.

5. The battery of claim 1 wherein the battery is characterized by a rated charge voltage greater than about 4.7 V.

6. The battery of claim 1 wherein the battery is characterized by a rated charge voltage greater than about 4.9 V.

7. The battery of claim 1 wherein the cathode comprises nickel, manganese, and cobalt.

8. The battery of claim 1 wherein the anode comprises activated carbon.

9. A method of making a high voltage battery capable of several cycles of charging and discharging, comprising:
   providing a liquid electrolyte solution comprising a lithium salt, a non-aqueous solvent, and a polymeric additive, wherein the polymeric additive includes poly (methyl vinyl ether-alt-maleic anhydride) and is soluble in the non-aqueous solvent at 30° C.;
   providing an anode;
   providing a cathode;
   assembling the anode and cathode and a separator into an electrochemical cell;
   adding the liquid electrolyte solution to the cell; and
   sealing the cell to form the high voltage battery.

10. The method of claim 9 wherein the cathode comprises nickel, manganese, and cobalt.

11. The method of claim 9 wherein the anode comprises activated carbon.

12. The battery of claim 1, wherein the polymeric additive does not increase the viscosity of the liquid electrolyte.

13. A battery capable of several cycles of charging and discharging comprising:
   an anode;
   a cathode; and
   a liquid electrolyte comprising a lithium salt, a non-aqueous solvent, and a polymeric additive, wherein the polymeric additive includes poly(methyl vinyl ether-alt-maleic anhydride) and is soluble in the non-aqueous solvent at 30° C.

14. The battery of claim 13, wherein a concentration of the polymeric additive is no less than 0.2 weight percent and no greater than 10 weight percent of a total weight of the liquid electrolyte.

15. The battery of claim 13, wherein the battery is characterized by a rated charge voltage greater than about 4.2 V.

16. The battery of claim 13, wherein the battery is characterized by a rated charge voltage greater than about 4.5 V.

17. The battery of claim 13, wherein the battery is characterized by a rated charge voltage greater than about 4.7 V.

18. The battery of claim 13, wherein the battery is characterized by a rated charge voltage greater than about 4.9 V.

19. The battery of claim 13, wherein the cathode comprises nickel, manganese, and cobalt.

20. The battery of claim 13, wherein the anode comprises activated carbon.

* * * * *